United States Patent [19]

Tajiri et al.

[11] Patent Number: 5,119,598
[45] Date of Patent: Jun. 9, 1992

[54] METHOD OF CONSTRUCTION OF TOP SLAB FOR A NUCLEAR CONTAINMENT BUILDING

[75] Inventors: Akinori Tajiri, Hitachi; Tadao Suzuki, Kure; Kouichi Ushiroda; Hideyasu Furukawa, both of Hitachi; Yasuyoshi Shimazaki, Tokyo; Kenji Sekiguchi, Tokyo; Keiji Nakanishi, Tokyo; Masami Hosoda, Tokyo, all of Japan

[73] Assignees: Hitachi Ltd.; Shimizu Construction Co., Ltd., both of Tokyo, Japan

[21] Appl. No.: 590,172

[22] Filed: Sep. 28, 1990

[30] Foreign Application Priority Data

Sep. 28, 1989 [JP] Japan .................................. 1-253598

[51] Int. Cl.⁵ .............................................. G21C 21/00
[52] U.S. Cl. .......................................... 52/741; 264/32; 376/293
[58] Field of Search ................ 52/741, 745; 376/293, 376/294, 295, 296; 264/30-34

[56] References Cited

U.S. PATENT DOCUMENTS

| | | | |
|---|---|---|---|
| 4,627,213 | 12/1986 | Magnin | 52/745 |
| 4,643,872 | 2/1987 | Schoening | 376/296 |
| 4,797,250 | 1/1989 | Moreau | 376/296 |
| 5,012,627 | 5/1991 | Lundmark | 52/741 |

Primary Examiner—John E. Murtagh
Attorney, Agent, or Firm—Scully, Scott, Murphy & Presser

[57] ABSTRACT

A method of constructing a top slab to provide a containment roof over a nuclear-power generating building, in particular, a method for utilizing overhead spaces bounded by a wall of the containment building and a shielding wall of the pressure vessel building, wherein the sequential steps involve; erecting a plurality of paired support columns on tops of the wall and of the shielding wall; building upper structural components across said paired support columns; installing a slab liner equipped with slab anchors beneath said lower structural components by suitable joining means; constucting a reinforcing network above said lower structural components; encasing said lower structural components and said reinforcing network; and pouring concrete over the slab liner to a suitable depth.

7 Claims, 5 Drawing Sheets

METHOD OF CONSTRUCTION OF TOP SLAB FOR A NUCLEAR CONTAINMENT BUILDING

BACKGROUND OF THE INVENTION

1. Field of the Invention

This invention relates to a method of construction of the top slab of a nuclear containment building

2. Related Art

In the procedure for constructing a nuclear containment building (hereinafter referred to as the building), there have been two traditional methods of constructing the top slab on top of a cylindrical wall (hereinafter referred to as the wall) structure.

A method of construction will be explained in reference to FIG. 7. In an area bounded by the wall 1, a floor slab 3 and the shield wall 2 of the pressurized reaction vessel (not shown), a plurality of support columns 4 are built to support radially-arranged support beams 4a which, in turn, act as a support for a slab support 6. After installing reinforcing members, the top slab 7 is poured, as illustrated by a dotted line in FIG. 7.

Another method of constructing a top slab in an area sectioned off by the wall 1, a floor slab 3 and the shield wall 2 of the pressurized reaction vessel is explained with reference to FIG. 8. In this method, support components 9 and 10 are first constructed on the top sections of the wall 1 and shield wall 2. A plurality of large beams 11 are spanned across radially said components 9 and 10 in between the upper and lower steel reinforcements (hereinafter referred to as upper and lower reinforcements) of the top slab 7. Said large beam 11 are supported by means of hanging bolts 12 and anchors 13a which are welded to the back side of the slab liner 6. The top slab 7 is formed by pouring concrete as indicated by dotted lines in FIG. 8.

Practising of these procedures presents the problems of installation as described in the following.

In the method of FIG. 7, the support columns 4 and 4a sustain the stresses imposed by the slab liner 6, the weight of the reinforcements and the concrete as well as the stresses accompanying installation activities. However, the floor spaces on said floor slab 3 are limited because of a large number of facilities, such as other equipment and piping, which are already installed inside the building. Consequently, it becomes difficult to place said columns in all of the optimum positions to support the loads imposed by the heavy section top slab and accompanying installation activities. Furthermore, integral fastening metal components at the bottom surfaces of the slab liner 6 mechanically interfere with the top surfaces of the support column 4 at the points of contact with the said supports. In addition, this technique requires a large number of columns and trusses to be temporarily erected on top of the floor slab 3, and upon completion of the installation of the top slab 7, all of the said columns and beams need to be removed from the interior of the building. However, as stated earlier, much of the interior spaces are already filled with various equipment, and it is extremely difficult to secure open paths to dismantle and transport such masses of residual materials.

In the method of FIG. 8, on the other hand, a load supporting member is constructed by pouring concrete in the spaces available in beam 11. However, because of the limited distances between the upper and lower reinforcements in top slab 7, the substantial height of said beam 11 becomes restricted and approaches that of a full web beam, and therefore, the elasticity of the top slab 7 presents a problem. This technique has an additional problem of not being able to optimize positioning of the load-bearing components of the top slab, such as beam 11, hanging bolts 12, liner anchor 13a, on the one hand, and the reinforcements within the top slab 7, on the other.

SUMMARY OF THE INVENTION

It is an object of the present invention to provide an improved means for constructing the top slab of a nuclear containment building to enable effective utilization of the spaces above and below said slab during the construction phase.

Another object of this invention concerns an improved means for constructing the top slab of a nuclear containment building, to enable optimum placements of load bearing components of said slab without being constrained by the presence of steel reinforcements within the said slab.

One aspect of this invention concerns an improved method for installing a top slab on top of a section of a nuclear containment building bounded by the wall, a floor slab and the shield wall of the pressurized reaction vessel. A top-load carrying member is spanned across several support columns constructed on top edges of the wall and the shield wall. A bottom-load carrying member is constructed by attaching slab anchors to slab liner by means of hanging devices, followed by the installation of reinforcements within the said member. The resulting assembly is encased in concrete to cover the slab liner assembly.

By following this construction procedure, it is possible to reduce the number of beam components within the top slab, as well as the number of support columns to be erected on the floor. The doubly beneficial results are achieved because the construction load is supported by both the upper- and the lower-load carrying members thereby improving the structural elements, and also because the improved slab requires less support columns thereby reducing the column placement restrictions imposed by the existing equipment. The construction efficiency can also be improved by placing the said load carrying member in parallel to the shielding wall to create less interference with the flow of construction activities than that experienced in the traditional method.

Furthermore, the efficiency of clean up operation is improved because there are lesser number of columns to be removed from the construction site than those in the traditional method of construction.

It is a further aspect of the present invention to provide an alternative improved method of constructing top slab. In this method, several temporary support columns are constructed on top edges of the cylindrical and shield walls, and a lower load-carrying-member is constructed by attaching slab anchors to slab liner by means of hanging devices, followed by the installation of reinforcements within the said member. Next, an upper-load carrying member is spanned across temporary support columns, constructed on top edges of the cylindrical and shield walls. The upper and lower load carrying members are mechanically connected by means of hanging components, and this hanging assembly and the reinforcements are encased in concrete to cover the slab liner assembly.

By following this construction procedure, it is possible to eliminate slab liner support columns erected on the floor slab before the construction of the upper load carrying member, because of the presence of the temporary support columns on top edges of the cylindrical and shield walls. This procedure avoids interference with equipment and facilities already existing on the floor slab and eliminates the problems associated with traditional techniques.

DETAILED DESCRIPTION OF THE PREFERRED EMBODIMENTS

Figure 1:
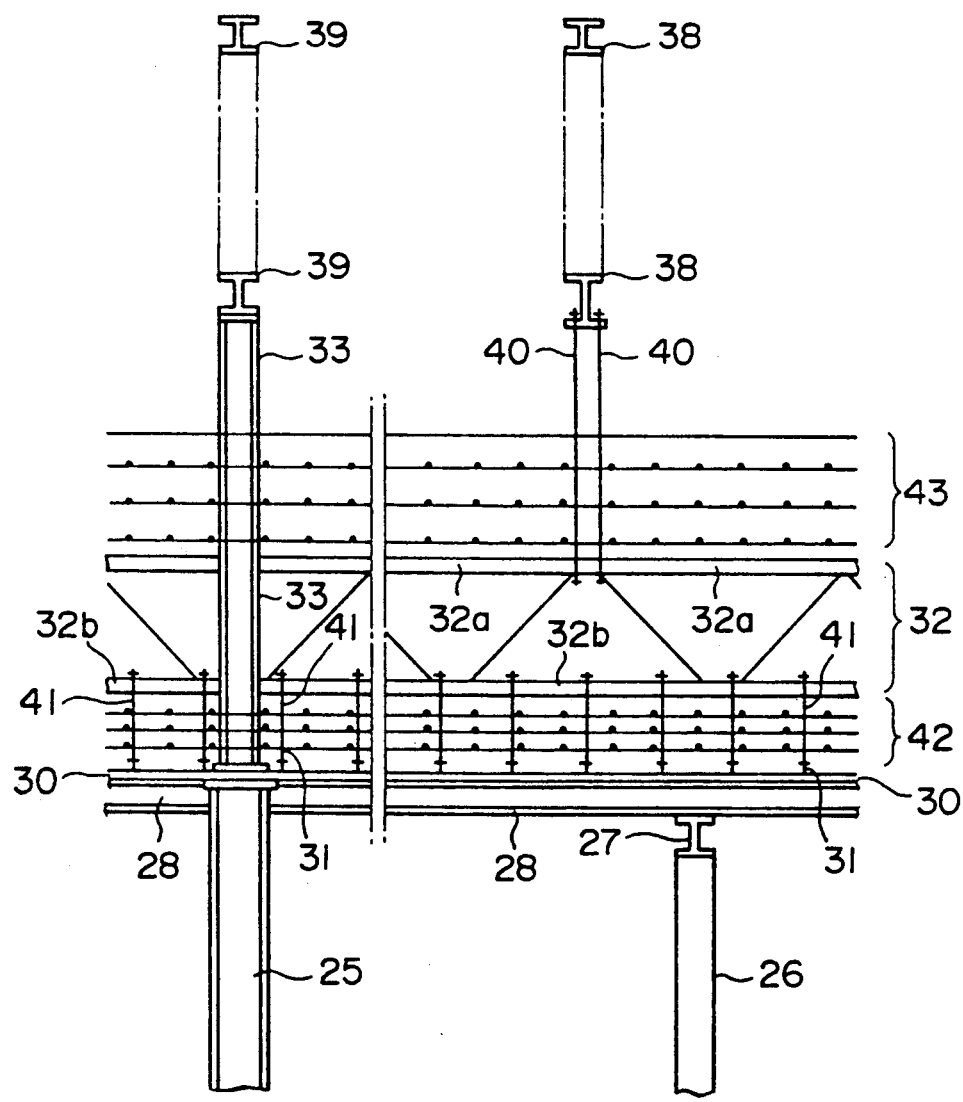
FIG. 1 is a first preferred embodiment of this invention, showing a cross section of a slab liner, the reinforcements and various temporary components of a top slab being constructed using the invented technique.
Figure 2:
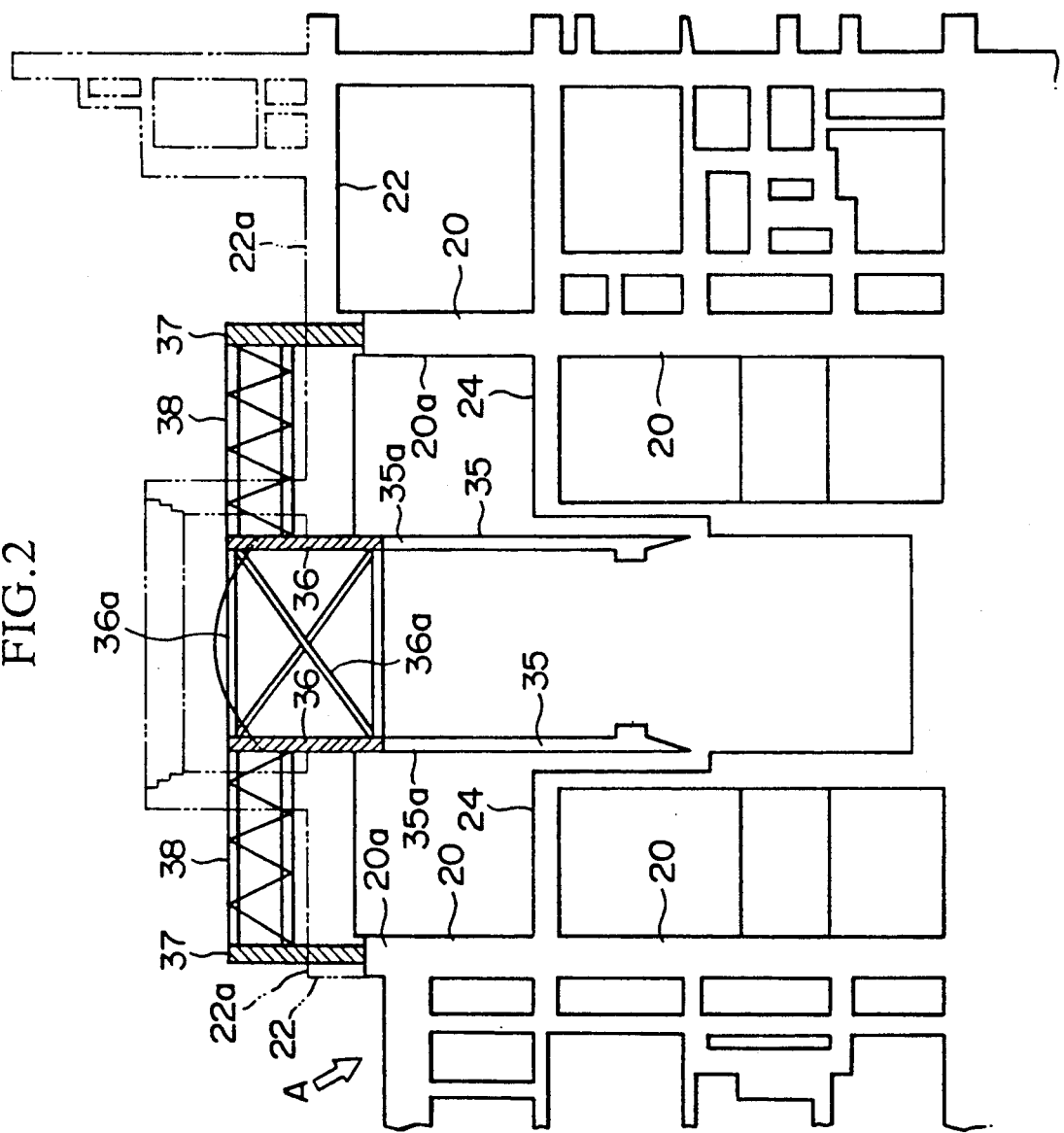
FIG. 2 is a cross sectional view of the roof under construction according to said embodiment.
Figure 3:
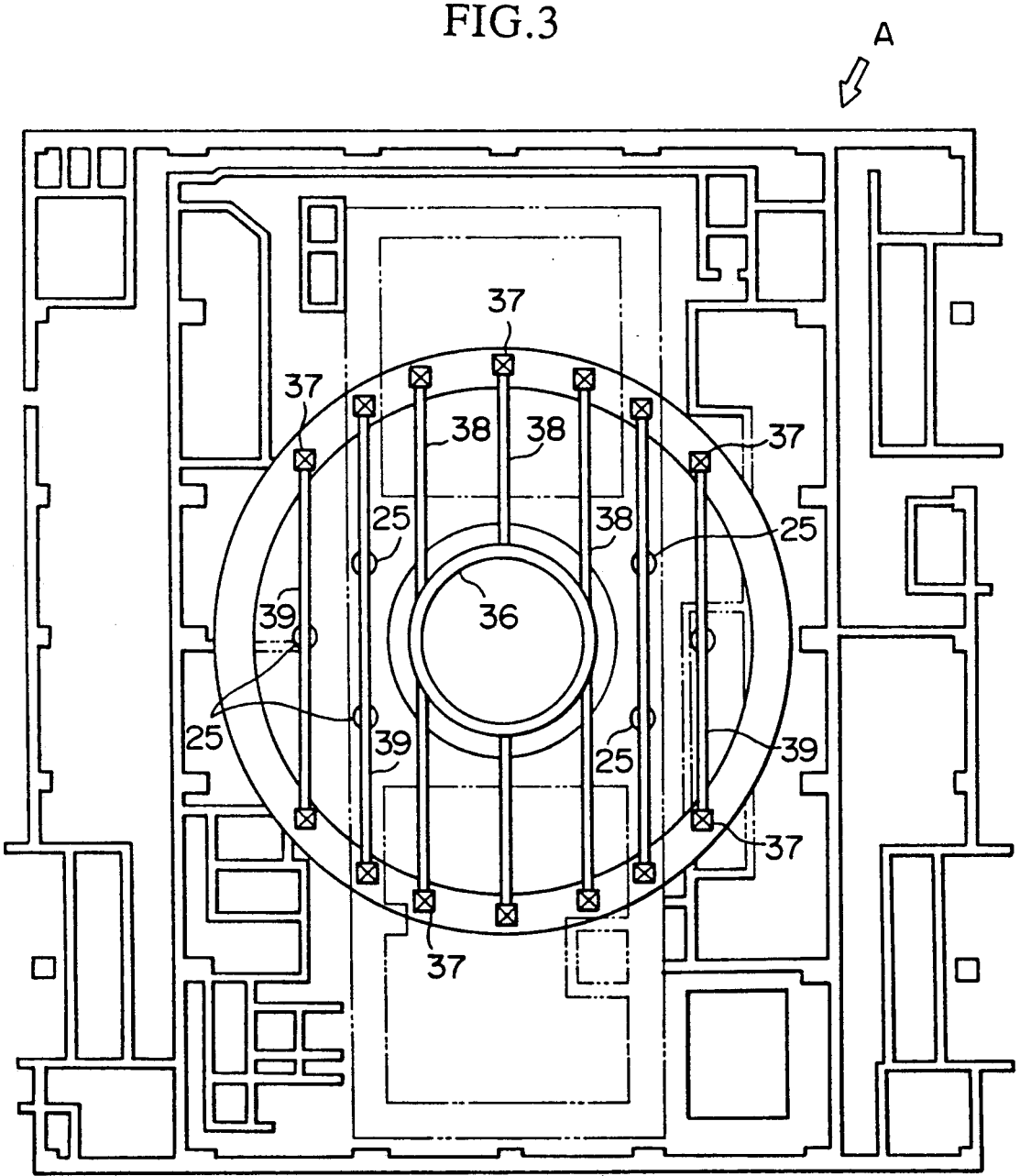
FIG. 3 is a plan view of the roof under construction according to said embodiment.

FIGS. 1 to 3 illustrate a first preferred embodiment of the present invention to construct a top slab of a nuclear containment building. As shown in FIG. 2, the side wall 20 had already been constructed in the interior of the building A. The invented technique was used to construct a top slab 22 on top of the existing wall 20 in an area defined by a double-dot broken line in FIG. 2.

The first step was to construct temporary supports 26 on top of the floor slab 24 to support the top slab 22, in an arrangement which can be seen in FIG. 1 and FIG. 2. Next step was to install horizontal sleeper beams 27, which step was followed by laying of floor joists 28 perpendicular to said sleeper beams. The both beams were made of wide-flange I-beams.

The slab liner 30, equipped with pre-installed anchors 31 and other ancillary components, was then laid horizontally on top of the floor joists 28. Next, using the slab liner 30 as a platform, lower reinforcing assembly 42 and lower truss structures 32 (a lower support component) were installed. The construction of the lower support structure was completed by joining said truss 32 to said liner anchor 32 with hanging bolts 41.

The upper reinforcing assembly 43 was installed next. In the meantime, a ring support 36 was constructed on the top section 35a of the shielding wall 35 located in the center of the building. Next, the ring support 36 was reinforced from the inside with reinforcements 36a as shown in FIG. 2, followed by the erection of a series of support columns 37 on the circumferential top edges 20a of the wall 20, as shown in FIG. 3. It is necessary to ensure that the heights of the ring support 36 and the support columns are larger than that of the top slab.

Next, upper truss structures 38 (an upper support component) were constructed horizontally and parallel to each other on top of the ring supports 36 and support columns 37. The supports on both sides of the upper truss structure 38 were provided, as shown in FIG. 3, by installing long-span trusses 39 in parallel with each other, utilizing the remaining columns 37 located on top surface of the wall 20. The long-span truss 39 was supported at suitable distances with reinforcing bundles 33, placed on top of the support column 25 standing on the floor slab 24.

The upper support assemblies were constructed by joining the upper truss 38 and 39 with lower truss structure 32 by attaching hanging bolts 40 to the flange sections of the said components 38 and 39 and to the reinforcing plates 32a of the lower truss structure 32.

The slab liner 30 was held in place by a large number of slab anchors 31, through hanging bolts 41 whose opposite ends were attached to the reinforcing plates 32b of the lower truss structure 32, which truss structure forming an integral lattice network for the lower support section of the top slab.

After installing the lower truss structure 32, upper and lower trusses 38 and 39 and all the necessary reinforcing lattice network as shown in FIG. 1, the concrete was poured onto the surface of the slab liner 30, and into the rest of the spaces in the lower and upper reinforcing assemblies 42 and 43 to construct the top slab 22 as shown by the double-dot broken lines in FIG. 2. It should be noted that the slab liner 30 must withstand large stresses imposed by concrete weight and other construction activities; therefore, it is important to install a sufficient number of liner anchors 31 to provide proper support for the slab liner. Furthermore, if the top slab is too large to be free-standing, the temporary support components for the slab liner, support columns 26, sleeper beams 27 and floor joists 28 need not be removed so as to provide additional support for the top slab.

In the construction procedure for the top slab as described above, the structural components such as sleeper beams 27, floor joists 28, slab liner 30 and liner anchors 31, the lower reinforcing assembly 42, the lower truss structure 32 and the upper support assembly 43 can all or partially be assembled on the ground and lifted to the site with a suitable lifting mechanism, such as a crane, to improve construction efficiency.

By following the construction procedure for the top slab as described above, it is possible to reduce the number of support columns 25 and 26 for the top slab 22, because the support is provided by both upper truss structure 38 and the long-span truss 39, which span across the lower truss structure 32 and the wall 20. It follows that the placement restriction, due to the presence of equipment and facilities located on the floor slab 24, for the support columns 25 and 26 is also reduced. It further follows that, because of the lesser number of structural components such as support columns 25 and 26, sleeper beam 27, floor joists 28, the work is reduced of dismantling and removal of the components after the completion of the top slab construction. It should also be noted that in installing the integral fastening tools on the underside of the slab liner 30, there is less interference from the presence of structural components such as support column 25 and 26, sleeper beams 27 and floor joists 28.

The load transfer characteristics of the structure shown in FIG. 1 are excellent, because the load is transferred following a logical, compatible path through the structural components supporting the overall load;

from slab liner 30 to liner anchor 31, to lower truss structures 32, to upper and lower trusses 38 and 39. Furthermore, since the lower truss structure 32 is a lattice, it is easier to avoid an interference of hanging bolts 41 with the components of the lower reinforcing assembly. There are sufficient numbers of contact points with the slab liner 31, and the various components have excellent joinability. Because no part of the slab liner 30 is penetrated with structural components, said slab maintains good pressure tightness, and the pressure within the drywell (i.e. space above the floor slab 24) can be maintained.

After the completion of the construction of top slab 22, ring support 36 and reinforcements 36a are removed from the top section of shield wall 35 to make way for an installation of a pressure container for nuclear generator inside the pressure shield 35.

Figure 4:
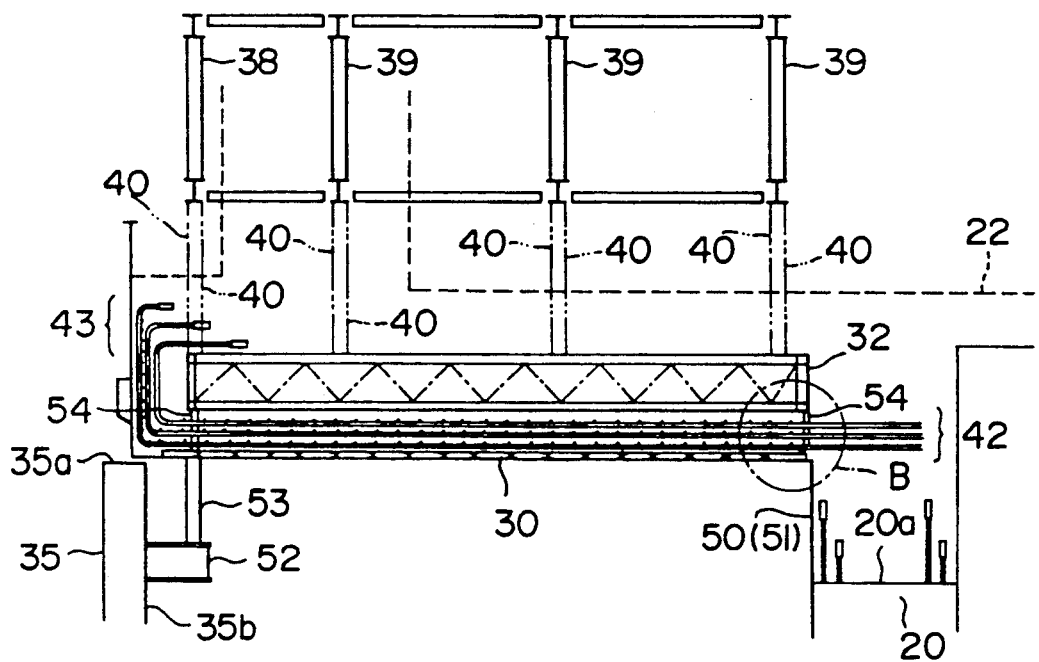
FIG. 4 is a second preferred embodiment of this invention, showing a cross section of a slab liner, the reinforcements and various temporary components of a top slab being constructed using the invented technique.
Figure 5:
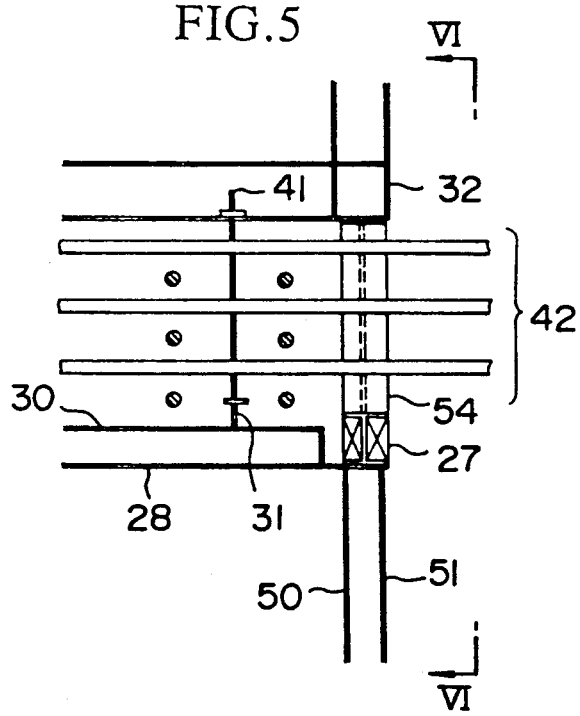
FIG. 5 is an enlarged view of a circled section B in FIG. 4.
Figure 6:
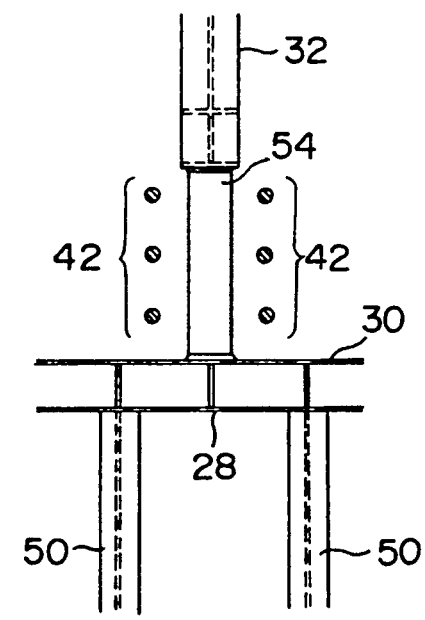
FIG. 6 is a sectional view at section VI—VI in FIG. 5.
Figure 7:
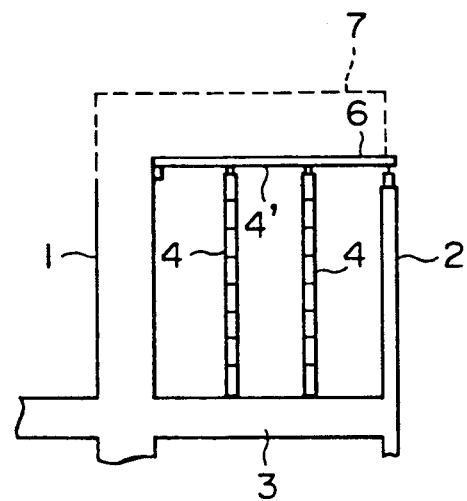
FIG. 7 is an illustration of a traditional method of constructing a top slab.
Figure 8:
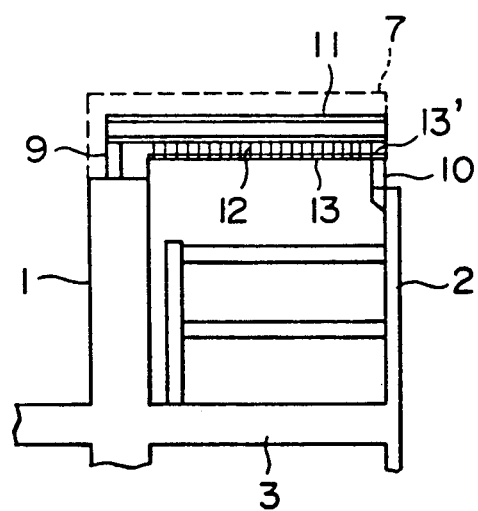
FIG. 8 is an illustration of another traditional method of constructing a top slab.

FIGS. 4 and 5 illustrate preferred embodiments for constructing a top slab of the building. The designations and symbols are the same as used in the preceding embodiment, and the explanations are omitted.

It will be recalled in the preceding embodiment that the slab liner 30 was needed to be supported by temporary support columns 26 erected on the floor slab 24, because the slab liner 30 was not suspended by a more permanent lower truss structure 32. It would be more efficient to be able to eliminate such temporary support columns from the drywell space to eliminate objects interfering with the installation of equipment inside the drywell space.

In this preferred embodiment, a method is presented for constructing a top slab 22, as shown by double-dot broken lines in FIG. 2, on top of the wall 20 already constructed within reactor building A.

As illustrated in FIGS. 4 and 5, the first step was to install a ring liner 50, having liner anchors 51 in the interior, on the top surface 20a of the wall 20 of the building. Also, a stepping ring 52 was installed temporarily on the interior wall 35b of the shielding wall 35. Temporary support columns 53, whose height reached the tip of the ring liner 50, was erected next on the top surface of the stepping ring 52. Between the top ledges of the stepping ring 52 and the ring liner 50, were installed horizontal sleeper beams 27, upon which a pair of supporting columns 54 were erected.

Floor joists 28 were then laid horizontally on top of the sleeper beams 27, and a metal slab liner 30, having pre-installed liner anchors 31, was laid on top. This was followed by an installation of a lower reinforcing assembly 42 on the top surface of the slab liner 30, and an installation of a lower truss structure 32 between the support columns 54. The lower truss structure 32 and the liner anchors 31 were joined by hanging bolts 41, and an upper reinforcing assembly 43 was then constructed on top of the lower truss structure 32.

In the meantime, a ring support was constructed around the top section 35a of the shielding wall 35, and a plurality of columns was erected on the top section 20a of the wall 20. The said columns provided support for the upper truss structures 38 and the long-span truss 39 which were constructed across said columns. The upper truss members 38, 39 and the lower truss structures 32 were joined together by using hanging bolts 40 as before.

When the installation of the upper truss structure 32 and the upper truss members 38 and 39 was completed, concrete was poured starting from the top surface of the slab liner 30 and proceeding on to cover the upper and lower reinforcing assemblies 42 and 43, and ultimately producing the top slab 22 of a cross section as shown by double-dot lines in FIG. 4.

When the preparatory construction steps, prior to the construction of the upper truss structures 38 and the long-span truss 39, are undertaken as presented above, the load imposed by the upper and lower reinforcing assemblies 42 and 43 is temporarily support by the lower truss structure 32 through additional load support members, that is, temporary support columns 53, support columns 54, the ring liner 50, and liner anchors 51. Accordingly, it is possible to eliminate the use of the temporary supports 26 (used to support the load of the slab liner 30), which occupy drywell spaces on top of the floor slab 24 and interfere, in general, with the construction activities inside the drywell, thus permitting unconstricted planning and execution of top slab construction activities. Additionally, the need to disassemble and remove the temporary supports 26 is eliminated.

It should be noted that in this preferred embodiment, the spaces inside the wall 20 also become available for construction activities other than the top slab construction. This is because the ring liner 50 and the liner anchors 51, erected on top of the wall 20, are used to provide support to the lower truss structure 32, in the absence of the upper truss structure 38 and the long-span truss 39; the present invention thereby eliminates the necessity for having additional support columns inside the walled structure.

What is claimed is:

1. A method of constructing a top slab for a nuclear-power generating building, the top slab providing a containment roof over at least an overhead space defined between a wall of the building and a shielding wall of a pressure vessel building, disposed within the building, the method comprising the steps of:
   (a) erecting a plurality of support columns on tops of the wall and of the shielding wall of the pressure vessel building;
   (b) interconnecting a plurality of upper structural components to said support columns so that the upper structural components are disposed within said space;
   (c) constructing a plurality of lower structural components within said space;
   (d) suspending the lower structural components within said space by and beneath the upper structural components;
   (e) suspending a slab liner by and beneath the lower structural components through joining means; and
   (f) pouring concrete into and over the suspended slab liner to a suitable depth, so that the concrete contains the lower structural components.

2. A method according to claim 1, wherein the steps described are performed according to the order recited in claim 1.

3. A method according to claim 2, wherein, between the steps (e) and (f), the following step is performed;
   (g) constructing a reinforcing network between the slab liner and the lower structural components.

4. A method according to claim 1, wherein the steps (c) and (e) are performed between the steps (a) and (b), the step (c) including the step of temporarily connecting the lower structural components to the walls of the building and the shielding wall of the pressure vessel building.

5. A method according to claim 4, wherein, before the step (f), the following step is performed;

(g) constructing a reinforcing network between the slab liner and the lower structural components.

6. A method of constructing a top slab for a nuclear-power generating building, the top slab providing a containment roof over at least an overhead space defined between a wall of a containment building and a shielding wall of a pressure vessel building disposed within the containment building, said method comprising the following steps, that should be performed according to the following order;
  (a) erecting a plurality of support columns on tops of the wall of the containment building and of the shielding wall of the pressure vessel building;
  (b) constructing a plurality of lower structural components within said space, so that the lower structural components are temporarily supported by the walls of the building and the shielding wall of the pressure vessel building;
  (c) suspending a slab liner by and beneath the lower structural components through joining means;
  (d) interconnecting a plurality of upper structural components to the plurality of erected support columns, so that the upper structural components are disposed within said space above the lower structural components;
  (e) suspending a plurality of lower structural components by the upper structural components through hanging means, so that load imposed by the lower structural components and the slab liner is substantially supported by the upper structural components; and
  (f) pouring concrete into and over the suspended slab liner to a suitable depth, so that the concrete contains the lower structural components.

7. A method according to claim 6, between the steps (c) and (d), the following step is performed;
  (g) constructing a reenforcing network between the slab liner and the lower structural components.

* * * * *